(12) United States Patent
Merrifield et al.

(10) Patent No.: US 12,085,413 B2
(45) Date of Patent: Sep. 10, 2024

(54) MEASUREMENT APPARATUS AND METHOD

(71) Applicant: RENISHAW PLC, Wotton-under-Edge (GB)

(72) Inventors: Benjamin Jason Merrifield, Bristol (GB); Graham Richard Ferguson, Rodborough (GB)

(73) Assignee: RENISHAW PLC, Wotton-under-Edge (GB)

(*) Notice: Subject to any disclaimer, the term of this patent is extended or adjusted under 35 U.S.C. 154(b) by 306 days.

(21) Appl. No.: 17/431,947

(22) PCT Filed: Mar. 11, 2020

(86) PCT No.: PCT/GB2020/050582
§ 371 (c)(1),
(2) Date: Aug. 18, 2021

(87) PCT Pub. No.: WO2020/183155
PCT Pub. Date: Sep. 17, 2020

(65) Prior Publication Data
US 2021/0381860 A1 Dec. 9, 2021

(30) Foreign Application Priority Data

Mar. 13, 2019 (EP) .................................... 19162622
Jul. 26, 2019 (GB) .................................... 1910687

(51) Int. Cl.
*G01D 11/24* (2006.01)
*G01D 11/26* (2006.01)
(Continued)

(52) U.S. Cl.
CPC .......... *G01D 11/245* (2013.01); *G01D 11/26* (2013.01); *G01N 21/15* (2013.01); *G01N 21/94* (2013.01);
(Continued)

(58) Field of Classification Search
CPC ...... G01N 21/15; G01N 21/94; G01N 21/954; G01N 2021/157
See application file for complete search history.

(56) References Cited

U.S. PATENT DOCUMENTS 6,940,554 B2 * 9/2005 Robins .................. H04N 23/81
348/335
8,175,757 B2 * 5/2012 Aggus ...................... G06F 1/20
361/695

(Continued)

FOREIGN PATENT DOCUMENTS

CN 1629675 A 6/2005
CN 101389446 A 3/2009
(Continued)

OTHER PUBLICATIONS

Jul. 1, 2020 Search Report issued in International Patent Application No. PCT/GB2020/050582.
(Continued)

*Primary Examiner* — Hung V Nguyen
*Assistant Examiner* — Hung Henry Nguyen
(74) *Attorney, Agent, or Firm* — Oliff PLC

(57) ABSTRACT

A measurement apparatus for mounting within an enclosure of a machine is described. The apparatus includes a measurement device and a protection means for protecting the measurement device from contaminants present within the machine enclosure. The protection means is switchable between at least a first mode that protects the measurement device from contaminants and a second mode that provides less protection of the measurement device from contaminants than the first mode. A contaminant sensor is used for sensing contamination within the machine enclosure and thereby determining when the protection means can adopt the second mode. A corresponding method is also described.

16 Claims, 4 Drawing Sheets

Figure 1:
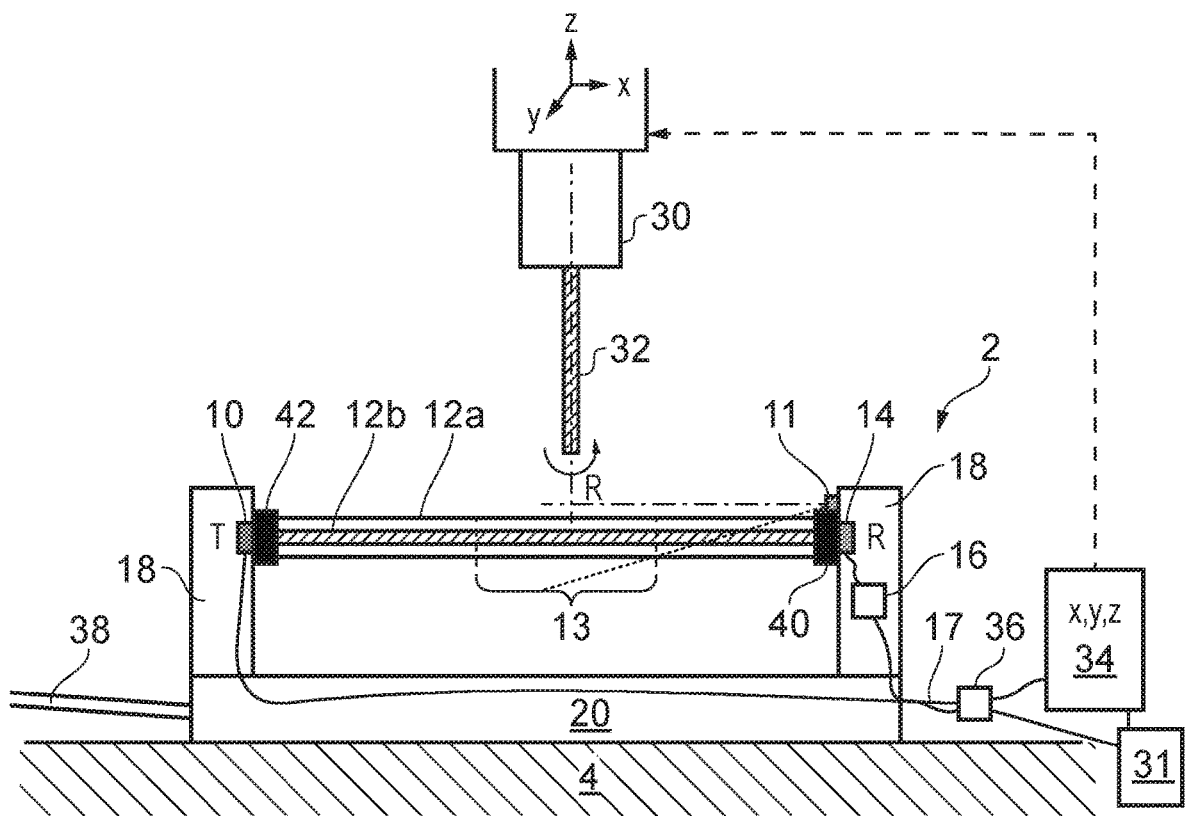

(51) Int. Cl.
*G01N 21/15* (2006.01)
*G01N 21/94* (2006.01)
*G01N 21/954* (2006.01)

(52) U.S. Cl.
CPC ..... *G01N 21/954* (2013.01); *G01N 2021/157* (2013.01)

(56) References Cited

U.S. PATENT DOCUMENTS

| | | | |
|---|---|---|---|
| 8,184,290 | B2 | 5/2012 | Hertens et al. |
| 8,444,330 | B2 | 5/2013 | Srivatsan et al. |
| 8,497,466 | B2 | 7/2013 | Martelli et al. |
| 10,471,515 | B2 | 11/2019 | Daut |
| 10,632,507 | B2 | 4/2020 | Nabavi |
| 11,173,524 | B2 | 11/2021 | Nabavi |
| 11,366,076 | B2 * | 6/2022 | Magee ................... G05B 1/03 |
| 11,433,499 | B2 | 9/2022 | Martelli et al. |
| 2005/0174648 | A1 | 8/2005 | Foote et al. |
| 2007/0177049 | A1 | 8/2007 | Kreysar et al. |
| 2009/0051933 | A1 | 2/2009 | Stimpson et al. |
| 2010/0206384 | A1 | 8/2010 | Martelli et al. |
| 2012/0087647 | A1 | 4/2012 | Srivatsan et al. |
| 2013/0161510 | A1 | 6/2013 | O'Connor et al. |
| 2013/0176429 | A1 | 7/2013 | Kurahashi |
| 2017/0239693 | A1 | 8/2017 | Nabavi |
| 2018/0112969 | A1 | 4/2018 | Bucher et al. |
| 2018/0141129 | A1 | 5/2018 | Daut |
| 2020/0156201 | A1 | 5/2020 | Martelli et al. |
| 2020/0230659 | A1 | 7/2020 | Nabavi |

FOREIGN PATENT DOCUMENTS

| | | |
|---|---|---|
| CN | 101801600 A | 8/2010 |
| CN | 102581700 A | 7/2012 |
| CN | 204228583 U | 3/2015 |
| CN | 105569601 A | 5/2016 |
| CN | 106999994 A | 8/2017 |
| CN | 206632757 U | 11/2017 |
| CN | 107427982 A | 12/2017 |
| EP | 1 050 368 A1 | 11/2000 |
| JP | H04-050601 A | 2/1992 |
| JP | H07-60616 A | 3/1995 |
| JP | H07-151946 A | 6/1995 |
| JP | 2000-24880 A | 1/2000 |
| JP | 2001-108880 A | 4/2001 |
| JP | 2001-328049 A | 11/2001 |
| JP | 2006-343698 A | 12/2006 |
| JP | 2007-301649 A | 11/2007 |
| JP | 2009-270846 A | 11/2009 |
| JP | 2010-513903 A | 4/2010 |
| JP | 2010-538850 A | 12/2010 |
| JP | 2012-86350 A | 5/2012 |
| JP | 2015-182159 A | 10/2015 |
| KR | 101848464 B1 | 5/2018 |
| TW | 201902616 A | 1/2019 |
| WO | 2009/034147 A1 | 3/2009 |
| WO | 2016/058105 A1 | 4/2016 |
| WO | 2018/049137 A1 | 3/2018 |
| WO | 2018/228998 A1 | 12/2018 |
| WO | 2019/053432 A1 | 3/2019 |

OTHER PUBLICATIONS

Jul. 1, 2020 Written Opinion issued in International Patent Application No. PCT/GB2020/050582.
Sep. 20, 2019 Extended Search Report and Written Opinion issued in European Patent Application No. 19162622.5.
Jul. 3, 2020 Search Report issued in International Patent Application No. PCT/GB2020/050581.
Jul. 3, 2020 Written Opinion issued in International Patent Application No. PCT/GB2020/050581.
Aug. 18, 2021 U.S. Appl. No. 17/432,014 in the name of Graham Richard Ferguson et al.
Jan. 24, 2020 Search Report issued in Great Britain Patent Application No. GB1910687.1.
Sep. 11, 2023 Office Action issued in U.S. Appl. No. 17/432,014.
May 1, 2024 Notice of Allowance issued in U.S. Appl. No. 17/432,014.

* cited by examiner

MEASUREMENT APPARATUS AND METHOD

The present invention relates to measurement apparatus and more particularly to an apparatus and method for better protecting measurement devices from the harsh environment within a machine tool enclosure.

It is known to protect devices, such as non-contact tool measurement devices, from the contaminants (e.g. coolant, cutting debris etc) that arise from machining operations. For example, laser tool setters and vision (camera-based) tool setters for machine tools are known that include means to protect optical components against the ingress of contaminants.

A laser tool setter detects when a tool held by a machine tool breaks a narrow laser beam. This allows measurements, such as tool length and diameter, to be collected. EP1050368 describes such a laser tool setter in which the laser beam can enter and exit the device via narrow apertures. In use, a protective flow of air is bled out of the optical apertures to reduce the risk of contaminants etc entering the device and obscuring the optical pathway. This air flow can be turned off when the machine tool is not in use. The NC4 non-contact tool setting system sold by Renishaw plc, Wotton-Under-Edge, UK is an example of such a system.

Vision or camera-based tool measurement devices are also known in which an imaging sensor captures images of a tool. The CU2 tool measurement system sold by Conoptica, Klaebu, Norway is an example of such a device. A typical vision-based tool setting system includes a light source for illuminating a tool and an imaging sensor for collecting images of that tool. A mechanical shutter is often used to protect the imaging sensor from the harsh machine tool environment and the machine tool controller instructs the vision tool measurement device to open and close its shutter as appropriate. For example, the shutter is opened when a tool is to be inspected and closed to protect the imaging sensor when machining operations, which often use streams of pressurized coolant and generate large amounts of cutting debris, are being performed. Opening the shutter when coolant or debris are present will cause contamination of, or damage to, the optical components requiring the device to be disassembled for cleaning or repair to prevent a degradation in measurement performance.

WO2019/053432 describes a tool measurement device having an imaging sensor that is configured for operation in both a vision mode and a laser emulation mode.

According to a first aspect of the present invention, there is provided a measurement apparatus for mounting within an enclosure of a machine, the measurement apparatus comprising;
 a measurement device, and
 a protection means for protecting the measurement device from contaminants present within the machine enclosure, the protection means being switchable between at least a first mode that protects the measurement device from contaminants and a second mode that provides less protection of the measurement device from contaminants than the first mode,
 characterised in that the apparatus comprises a contaminant sensor for sensing contamination within the machine enclosure, the sensed contamination being used to determine when the protection means can adopt the second mode.

The present invention thus relates to measurement apparatus configured so that it can be mounted and operate within the harsh operating environment of a machine. For example, the apparatus may be configured for mounting within the enclosure of a machine tool in the form of a metal cutting machine, milling machine, lathe, machining centre etc. The measurement apparatus comprises a measurement device, such as a non-contact or contact tool setting device. A protection means (which herein is also termed a protection system, protection apparatus or protection device) is also provided for protecting the measurement device from any of the contaminants (e.g. coolant, cutting debris etc) that may be present within the machine enclosure.

The protection means are switchable between at least a first mode and a second mode. The first mode is arranged to provide the measurement device with at least some protection from contaminants. The first mode may comprise, for example, a protective physical barrier that is moved to protect the measurement device (e.g. a shutter may be closed to seal against the machine environment) and/or a stream of air that performs a protective function (e.g. air may be expelled from an aperture through which light also passes). The second mode provides less protection to the measurement device than the first mode. For example, the physical barrier may be moved so that the measurement device is uncovered (e.g. a shutter may be at least partially opened) and/or a protective stream of air may be shut off or provided at a lower flow rate. As explained below, the measurement device may not be able to take any measurements at all when the protection means is in the first mode (e.g. so the second mode would have to be entered before measurements can be taken). Alternatively, the accuracy or type of measurements that can be taken in the first mode may be less than that possible in the second mode.

The measurement apparatus of the present invention also comprises a contaminant sensor for sensing contamination within the machine enclosure. As explained below, the contaminant sensor may form part of the measurement device itself (e.g. a common optical sensor may be used for both measurement and contaminant sensing). Alternatively, the contaminant sensor may be integrated into the housing that also contains the measurement device or it may be provided as a separately mounted unit. The sensed contamination (i.e. as measured by the contaminant sensor) is used to determine when the protection means can adopt the second mode. In other words, the sensed contamination is used to indicate when the protection means can be safely switched into the second mode (i.e. where less protection of the measurement device is provided). This may be done by inhibiting or warning against the protection means entering the second mode when the sensed contamination is above a certain level. Alternatively, the second mode may be entered automatically when the sensed contamination drops below a certain level or the second mode may be left automatically when the sensed contamination increases above a certain level.

The present invention thus provides an improved way of ensuring that a measurement device mounted within a machine environment (e.g. within the casing or enclosure of a machine tool) is protected against any contaminants arising or used by the machine, such as coolant (which may be present in streams, droplets or as a mist), swarf, dust, powder, soot, smoke etc. For example, the present invention addresses the problem that contaminants may remain in a machine tool environment even after the cutting process has finished. For example, coolant mist generated by high speed part or tool rotation may not dissipate for some time after the coolant supply to a machine tool has stopped. Furthermore, machine tools spindles typically include various pipes or channels through which coolant is pumped to nozzles that spray large quantities of coolant at high pressure towards a tool or part being machined. It has been found that drops or streams of coolant may still be generated within the machine tool even after active coolant pumping is stopped, simply because such coolant can drain from the pipes and fluid channels when moving different parts of the machine tool (e.g. moving a spindle to bring a tool it is holding into a sensing relationship with a tool measurement device). Actively sensing the presence or otherwise of contaminants within the machine, rather than assuming the environment is clear immediately or shortly after the relevant machining process has finished, reduces the risk of the measurement device being contaminated to the point where it becomes inaccurate or simply stops functioning altogether.

The measurement apparatus may provide an indication to the associated machine controller (e.g. the machine tool controller of a machine tool) or user that the machine environment is, or isn't, sufficiently clear to allow the protection means to enter the second mode. For example, a control signal may be passed to the machine controller and/or a visual indicator (e.g. a colour changing light) may inform the user of the status. Advantageously, the apparatus is arranged so that the protection means can only be switched into the second mode (e.g. in response to a control signal sent by the machine controller) when the sensed contamination within the machine environment (i.e. as sensed by the contaminant sensor) is below a predefined threshold. If the measured contamination is above this threshold, an error signal may instead be sent back to the controller indicating that more time is required for the machine environment to clear. This error signal may be maintained until the sensed contamination drops below the threshold, or the controller may periodically re-request entry into the second mode (e.g. until the machine environment is found to be sufficiently clear).

After entering the second mode (i.e. where there is less protection of the measurement device compared with the first mode), the apparatus may remain in that second mode until it is instructed (e.g. by the machine controller) to re-enter the first mode. The contaminant sensor may only be used to sense contamination when the protection means is in the first mode. Alternatively, the apparatus may be arranged so that the protection means is switched into the first mode when the sensed contamination within the machine environment (as measured by the contaminant sensor) exceeds a threshold. In other words, the first (more protective) mode may be engaged when the sensed contamination increases above a predefined threshold level, thereby automatically protecting the measurement device. This requires contaminants to be distinguished from objects (e.g. tools) that are being measured by the measurement device. The protection means may be required to respond at a relatively high speed when entering the first mode if large amounts of contaminants are present and/or if they are moving at a high speed (e.g. if the coolant pumps are activated to generated a pressurised stream of coolant and/or if debris/coolant is being ejected from a tool rotating at a high speed).

An output from the contaminant sensor may be fed to the controller of the associated machine for analysis to determine the level of contamination present within the machine environment. Alternatively, the apparatus may comprise a controller for analysing the output of the contaminant sensor. The controller may be a standalone unit. Alternatively, the controller may be combined with a controller for the measurement device. The controller may also control the protection mean. In particular, the controller may control whether the protection means is in the first or second mode.

The controller may thus use the analysed output of the contaminant sensor when determining the mode to be adopted by the protection means. For example, as explained above, the controller may only permit the second mode to be entered when the sensed contamination is below a threshold level.

The measurement device that is provided as part of the measurement apparatus may be of any suitable type. The measurement device may measure the presence, size, location or state of an object. The measurement device may be used to view an object. In one embodiment, the measurement device may comprise a contact-based measurement device (e.g. a contact tool setting probe with a protruding stylus, a surface finish probe or an ultrasound probe). Advantageously, the measurement device comprises a non-contact measurement device. A conductive, inductive, or magnetic non-contact measurement device may be provided. Advantageously, the non-contact measurement device is an optical measurement device. Such an optical measurement device preferably includes an optical receiver and/or an optical transmitter. The optical receiver and/or the optical transmitter may include various components (e.g. lenses, windows, optical filters etc). The measurement device may comprise a camera (e.g. having an imaging sensor) for capturing images of an object. The protection means may be arranged to prevent contamination of the optical receiver and/or the optical transmitter. For example, the protection means may stop the occlusion, damage or fogging of the optical components of the optical transmitter and/or receiver (e.g. from the long-term or rapid build-up of contaminants on the optical components).

The protection means may comprise any suitable device for protecting the measurement device. If a contact-based measurement device is provided, the protection means could comprise a retractable shroud that can be extended to cover or protect the stylus (i.e. a first mode) and then retracted to allow the stylus to protrude sufficiently to enable contact with objects (e.g. tools) to be made (i.e. a second mode). The protection means may also comprise a gas (e.g. air) flow that prevents contaminants from building up on parts of the measurement device. In such an example, the first mode may comprise supplying pressurised gas (e.g. which is ejected through the optical apertures of the measurement device as described above) and the second mode may comprise supplying a reduced flow of gas or stopping the gas flow altogether. The first mode may thus provide air flow protection and the second mode provide reduced or no air flow protection.

Advantageously, the protection means comprises at least one shutter for protecting the measurement device. The shutter may be moveable (e.g. by rotation and/or translation). The shutter may be partially closed in the first mode. The shutter may be fully closed in the first mode. The shutter may be more closed (i.e. to obscure more of the measurement device) in the first mode than in the second mode. The shutter may provide a larger aperture in the second mode than in the first mode.

Alternatively, for an optical measurement device, the shutter may have a transparent window region through which light passes in the first mode and an aperture (i.e. a hole) through which light passes in the second mode. Movement of the shutter may be used to place the transparent window region or the aperture in an optical path of the measurement device. The transparent window region may thus become covered in contaminants in use but will still allow some light to pass thereby enabling contaminant sensing or low accuracy measurements. In contrast, the aperture of the second mode enables higher accuracy measurements to be performed (i.e. without the degradation to measurement accuracy that may occur when light passes through a window) but could allow some contaminants to reach the measurement device (i.e. a reduced level of protection is provided).

The protection means may comprise only one shutter. Alternatively, the protection means may comprise a plurality of shutters. The measurement device may comprise a receiver having a sensor and a transmitter having a light source. In such an example, a first shutter may be provided to protect the sensor and a second shutter provided to protect the light source. The shutter may be a mechanically operated shutter. Any suitable activation means may be used to move the shutter between the first and second modes. For example, each shutter may be pneumatically activated (e.g. by one or more pneumatic actuators) or electrically activated (e.g. by one or more electrical actuators). The shutter may include a biasing means (e.g. one or more springs or similar elements) to bias it into a default mode in the absence of power. For example, the shutter may enter the first mode by default if the power is removed. This has the advantage of providing a fail-safe arrangement (i.e. the higher protection of the first mode is provided if, for example, the power supply fails). A multi-stage shutter may also be provided. In other words, a series of shutter could be provided. For example, a first shutter element (e.g. a solid shutter with no apertures) may be closed to provide the first mode. The second mode may then comprise opening the first shutter element and closing a second shutter element (e.g. with an aperture).

The contaminant sensor may be provided in a variety of forms and may comprise any sensor that can detect, directly or indirectly, the presence of contaminants within the machine environment.

The measurement device may comprise a measurement sensor (e.g. an imaging array, camera, photodetector etc) that is used by that device to measure and/or view objects. In one embodiment, the contaminant sensor may also be provided by the measurement sensor of the measurement device. In other words, a single sensor may provide both the measurement sensor and the contaminant sensor. The single sensor can thus be used for both object and contaminant measurements. The single sensor may be an optical sensor. If the single sensor is an optical sensor, then the sensor output may be analysed to provide measurement information but also analysed to determine if contaminants are present in the machine environment. For example, changes in received light intensity or the pattern of light intensity (in the absence of an object to be measured) may be analysed to extract information on the contaminants present within the machine environment. The use of a single sensor has the advantage of allowing contamination to be measured in the region of space where measurements are to be made (e.g. in the vicinity of the measurement device that is being protected).

In an alternative embodiment, a separate contaminant sensor may be provided. In other words, the measurement device may include a measurement sensor that is different to and/or separate from the contaminant sensor. The contaminant sensor may directly sense the environment within the machine enclosure. This direct sensing may, for example, comprise passing a beam of light (or other wavelengths of electromagnetic radiation) from a source to a detector through a region within the machine enclosure. The contaminant sensor is conveniently an optical sensor that analyses received light that has passed to it through a region within the machine enclosure. The intensity or distribution of light reaching the detector, or the change in the intensity or distribution of light reaching the detector over time, may be used to directly measure the presence of contaminants.

The contaminant sensor may indirectly sense the environment within the machine enclosure. For example, the change in the amount or distribution of contaminants (e.g. liquid coolant) on a glass plate could be measured using a suitable contaminant sensor (e.g. an infrared sensor could be used to measure the amount of total internal reflection from the glass plate in a similar way to the rain sensor used on the windscreen of a motor vehicle). It would also be possible to measure the electrical conductivity between closely-spaced conductive strips to indirectly measure the amount of contamination of the machine environment.

The apparatus of the present invention may be formed as a single, unitary item. In other words, the measurement device, protection means and contaminant sensor may be provided within a single measurement unit. For example, an integrated non-contact tool setter may be provided that includes the non-contact tool measurement device, the protection means and the contaminant sensor. Such a device may have the same footprint and/or the same shape of housing as prior art apparatus that does not include the contaminant sensor. Forming the apparatus as a single integrated unit, noting that the apparatus may still include a separate interface for performing analysis functions etc, means that it can be easily installed on the bed of a machine. Alternatively, the contaminant sensor may be provided as a plurality of separate (non-integrated) unit or units. If the measurement device and the contaminant sensor are provided in separate units they may, in use, be appropriately orientated and spaced apart from one another. In other words, the required spatial relationship between the measurement device (with which the protection means may be integrated) and the contaminant sensor may be provided during installation on the machine. Such a modular arrangement allows retrofitting of existing system and may be more suitable for machines where space is limited.

The protection means may, when it is in the first mode (i.e. protecting the measurement device) prevent the acquisition of any measurements at all using the measurement device. For example, a shutter or cover of the protection means may prevent any measurements of an object or tool from taking place. The first mode preferably does not, however, prevent the contaminant sensor from sensing contaminants within the machine enclosure. This means that if, for example, the contaminant sensor is integral with the measurement device then the protection means should still allow contaminant measurements in the first mode.

In a preferred embodiment, the measurement device can acquire object measurements when the protection means is placed in either one of the first and second modes. The measurement device may have additional measurement functionality when the protection means is in the second mode. For example, a tool detection or emulation mode measurement (e.g. using a small field of view) may be possible with the protection means in the first mode. The second mode may also allow such tool detection or emulation mode measurements but may additionally allow images or other measurements of the tool to be taken over a much wider field of view. In other words, the reduced protection against contaminants that is afforded to the measurement device when the protection means is in the second mode may be accompanied by an increased measurement accuracy and/or an increase in the type or speed of measurements that can be collected using the measurement device.

The protection means may also be able adopt at least one additional mode. In other words, placing the protection means in one or more modes other than the first and second modes may be possible. For example, an additional mode may be provided that gives less protection than the second mode (e.g. the protection means may be completely disabled in such an additional mode). Advantageously, an additional (third) mode may be adopted that gives greater protection than the first mode. The third mode may, for example, provide a stronger (e.g. hermetic) seal against contaminants.

In a preferred embodiment, the protection means comprises a shutter having a first aperture and a second aperture that is larger than the first aperture. The first mode of the protection means may involve placing the first aperture in the optical path and also expelling air through the first (relatively small) aperture. In this example, a single sensor in the form of a two-dimensional imaging array may collect both object measurements and also provide the contaminant sensor (i.e. allowing the level of contaminants within the machine enclosure to be sensed when the protection means is in the first mode). This first mode may comprise the protection means being in the so-called constricted configuration that is described in more detail below. The second mode of the protection means may involve placing the second (larger) aperture in the beam path and stopping the flow of air (e.g. to allow larger area images of the tool to be acquired and also preventing the wastage of compressed air). This second mode may comprise the protection means being in the so-called open configuration that is described in more detail below. A third mode may involve completely blocking the optical path using an opaque region of the shutter. This third mode may seal the apparatus, but no measurements at all (either of the object or of contaminants) can then be acquired. The third mode is thus an off or deactivated state and may comprise the protection means being in the so-called closed configuration that is described in more detail below.

In a preferred embodiment, the measurement device comprises an optical tool-setting device having a transmitter for passing a beam of light to a receiver along an optical beam path into which a tool to be measured can be inserted. The protection means conveniently comprises a shutter. In use, tools are measured by bringing them into, or moving them through or out of, the optical beam. The machine onto which the apparatus is mounted preferably comprises a machine tool. Alternatively, the machine may be an industrial manufacturing machine of any type that generates contaminants during use. For example, a welding machine, an electrical discharge machine (EDM), a laser cutter, an additive manufacturing machine (e.g. that prints 3D objects from deposited layers of metal or plastic powder), a powder coating machine etc.

According to a second aspect of the invention, there is provided a method for operating a measurement apparatus mounted within the enclosure of a machine, the measurement apparatus comprising a measurement device and a protection means for protecting the measurement device from contaminants present within the machine enclosure, the protection means being switchable between at least a first mode that protects the measurement device from contaminants and a second mode that provides less protection of the measurement device from contaminants than the first mode, wherein the method comprises the steps of: (i) sensing an amount of contamination within the machine enclosure, and (ii) determining when the protection means can adopt the second mode based on the amount of contamination sensed in step (i). Step (ii) may comprise inhibiting the protection means from entering the second mode when the amount of contamination sensed in step (i) is above a preset threshold. The various features described herein relating to operation of the corresponding apparatus may also form part of the method.

Also described herein is a measurement apparatus for mounting within an enclosure of a machine, comprising; a measurement device, and a protection device for protecting the measurement device from contaminants present within the machine enclosure, the protection device being switchable between at least a first mode that protects the measurement device from contaminants and a second mode that provides less protection of the measurement device from contaminants than the first mode, wherein the apparatus comprises a contaminant sensor for sensing contamination within the machine enclosure, the sensed contamination being used to determine when the protection device can adopt the second mode.

A measurement apparatus is described herein. The measurement apparatus may be suitable for mounting within an enclosure of a machine. The machine may comprise a machine tool. The measurement apparatus may comprise a measurement device (e.g. a non-contact measurement device). The apparatus may include a protection means. The protection means may be for protecting the measurement device from contaminants present within a machine enclosure. The protection means may be switchable into at least a first mode that protects the measurement device from contaminants. The protection means may be switchable into a second mode. The second mode may provide less protection of the measurement device from contaminants than the first mode. The apparatus may comprise a contaminant sensor. The contaminant sensor may be used for sensing contamination within the machine enclosure. The sensed contamination may be used to determine when the protection means can adopt the second mode. The apparatus may include any one or more of the other features described herein.

Figure 2A:
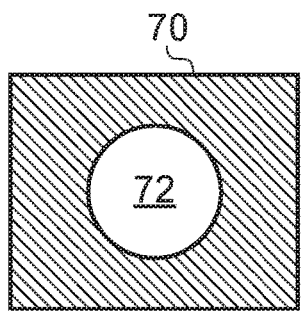
Figure 2B:
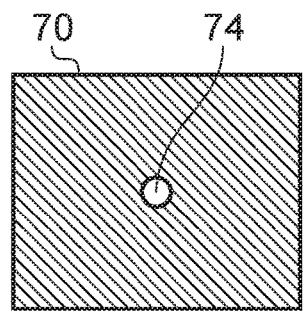
Figure 2C:
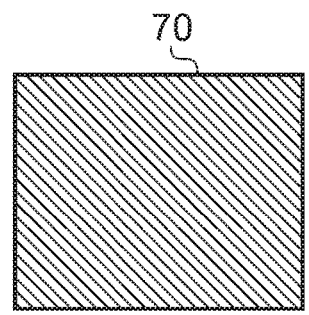
Figure 3:
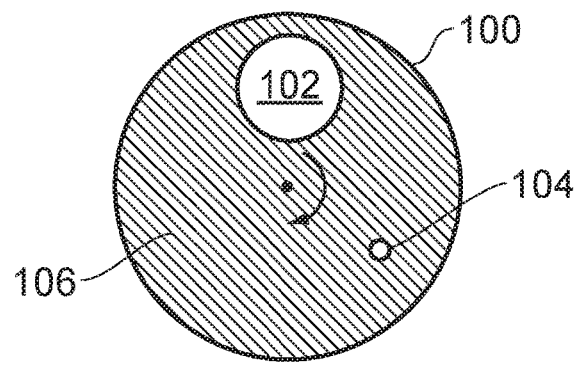
Figure 4:
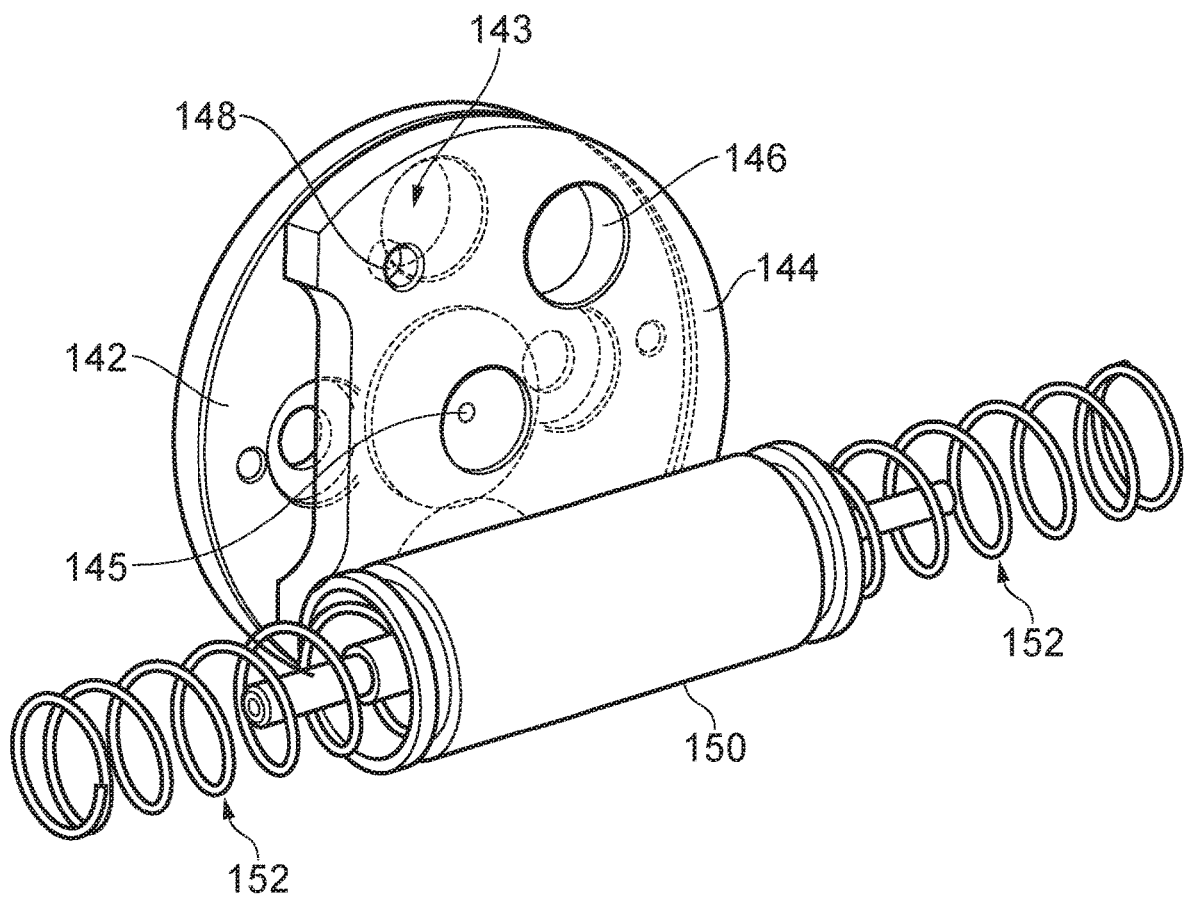
Figure 5:
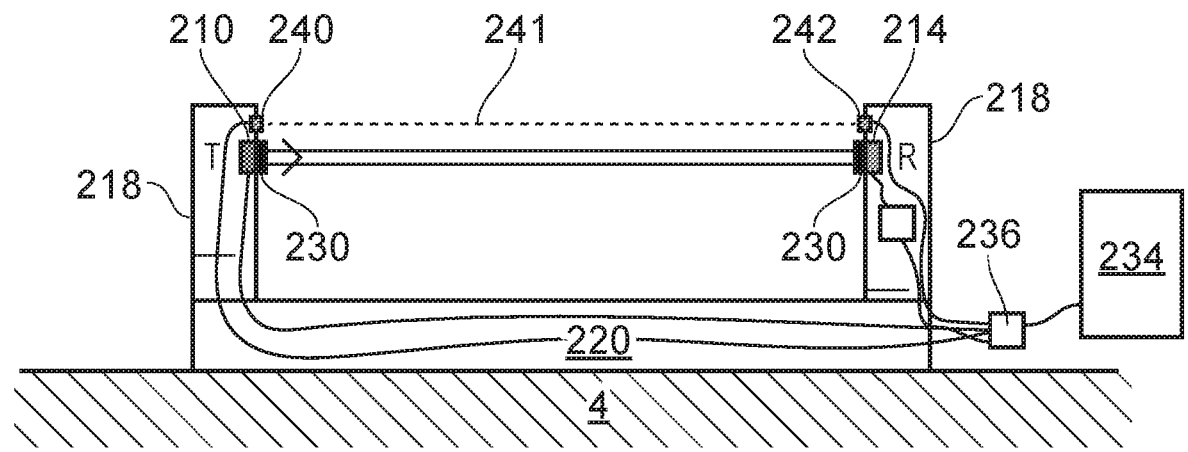
Figure 6:
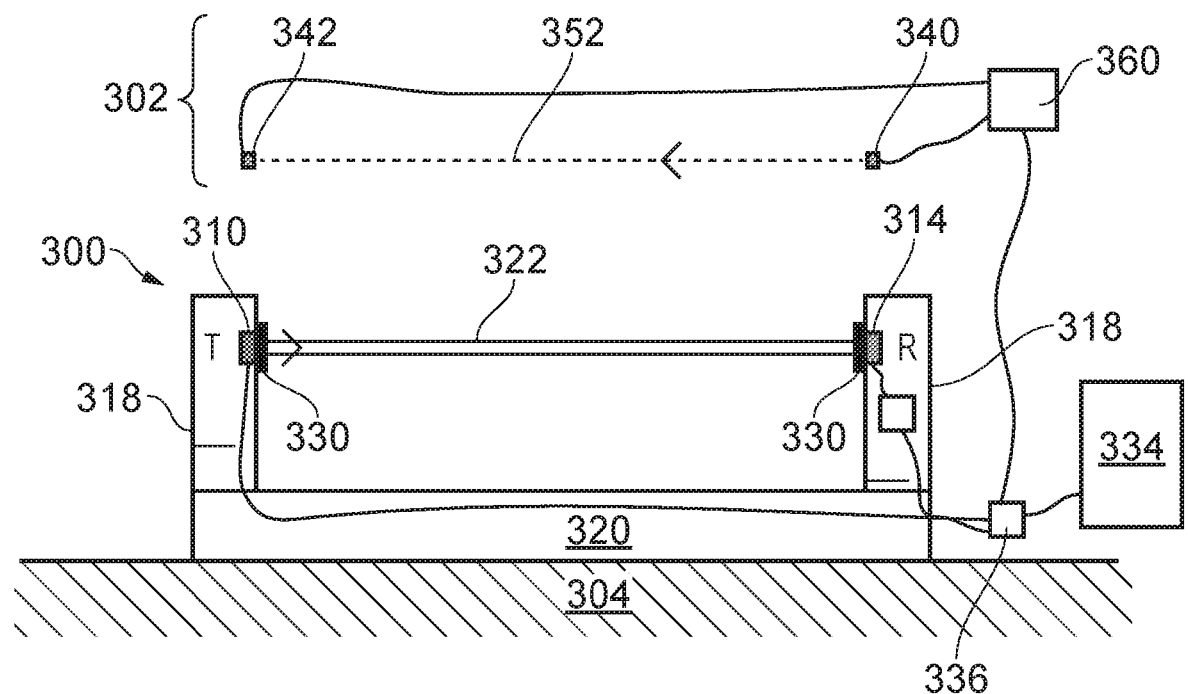
Figure 7:
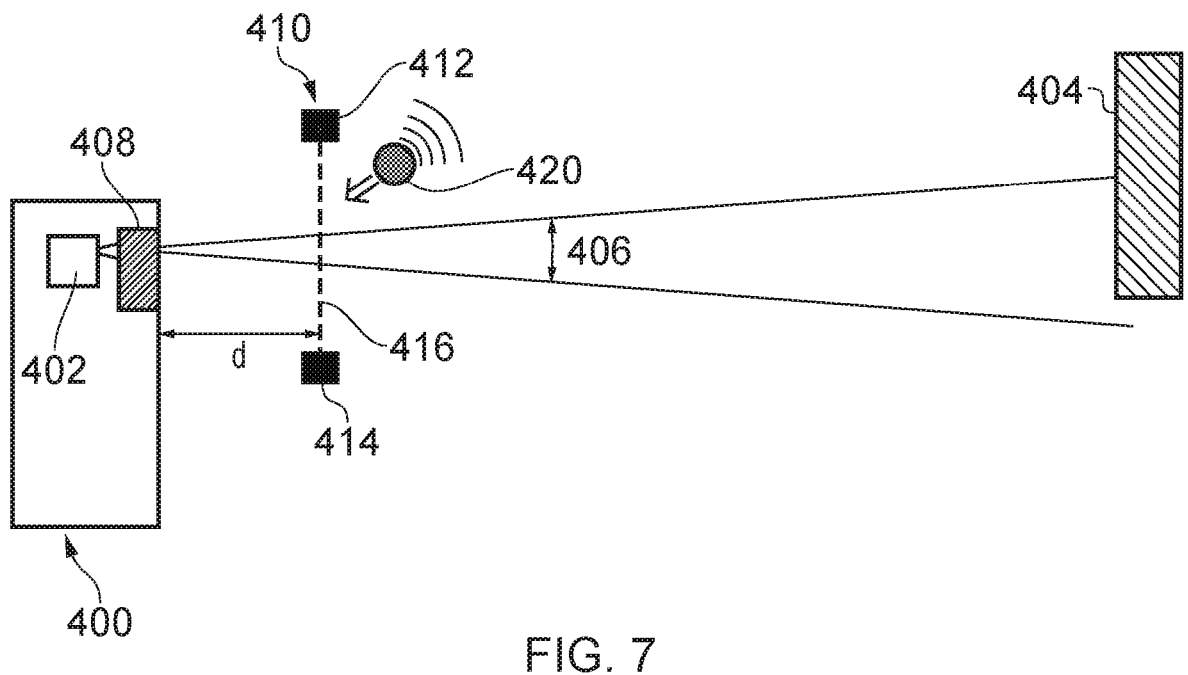
Figure 8:
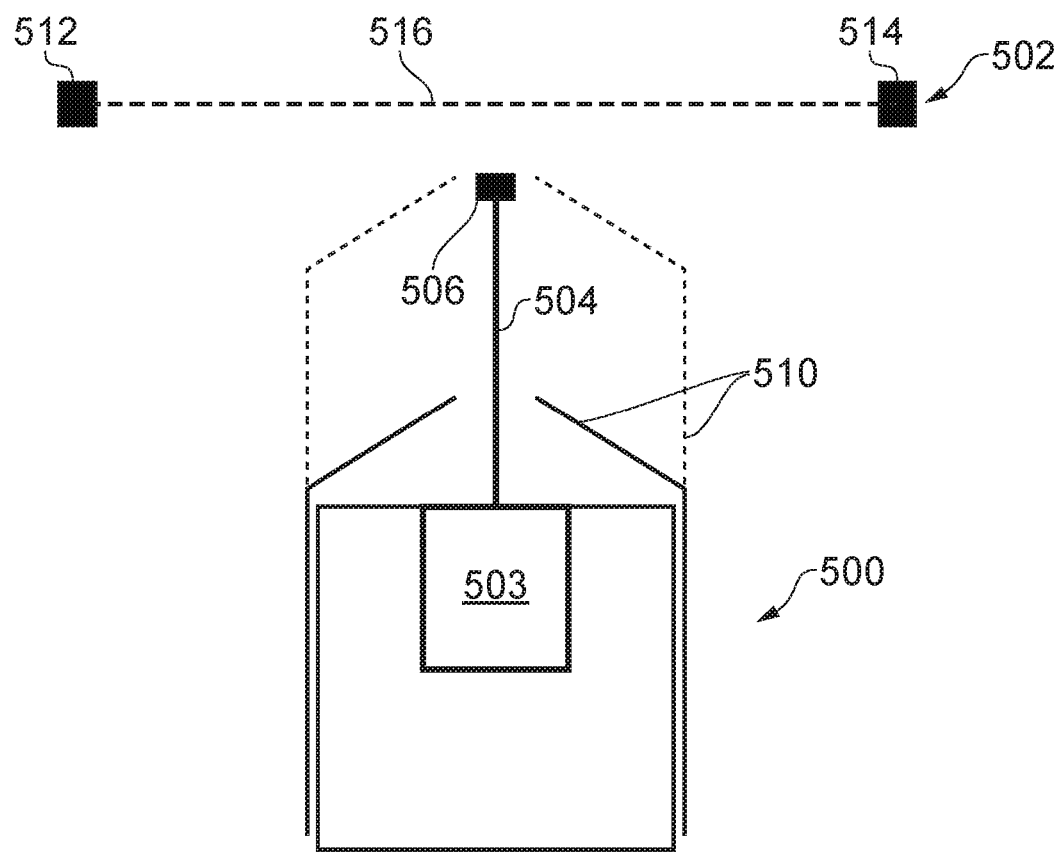

The invention will now be described, by way of example only, with reference to the accompany drawings in which;

FIG. 1 shows measurement apparatus comprising a tool setting device having a imaging sensor that is used for both object measurement and contaminant sensing, FIG. 2 illustrates a multiple-stage shutter assembly of the protection means of the apparatus of FIG. 1, FIG. 3 illustrates a multi-stage shutter assembly in the form of a rotatable disk, FIG. 4 shows a protection mechanism that includes the rotatable disk of FIG. 3, FIG. 5 shows measurement apparatus formed as a single unit but having a contaminant sensor that is separate to the measurement sensor of the measurement device, FIG. 6 shows measurement apparatus in which the measurement device and contaminant sensor are provided as discrete units, FIG. 7 illustrates the use of a contaminant sensor with a single sided non-contact measurement device, and FIG. 8 illustrates the use of a contaminant sensor with a contact-based measurement device.

Referring to FIG. 1, measurement apparatus of the present invention is illustrated that comprises a measurement device in the form of a tool setting device 2 that is mounted to the bed 4 of a machine tool. The tool setting device 2 comprises an LED light source 10 that emits a light beam. An imaging sensor 14 is also provided that comprises an array of 1000-by-1000 pixels (i.e. a 1 Megapixel array) for sensing light. The light source 10 and sensor 14 include appropriate optical elements (e.g. lenses etc). An analysis unit 16 (e.g. comprising a processor) is provided for analysing the intensity data collected by the imaging sensor 14. The light source 10 and imaging sensor 14 are contained within and affixed to a common base 20 by pillars 18. The light beam from the light source 10 is blocked from reaching the sensor 14 by opaque objects (e.g. tools) placed in the tool-sensing region 13. A secondary light source 11 may also be provided for front-lighting the tool.

The machine tool to which the tool setting device 2 is mounted also includes a spindle 30 for holding a tool 32. The spindle is rotatable about rotation axis R (i.e. to allow the tool to be rotated about its longitudinal axis). The spindle 30 is rotated and moved around within the machine tool under the control of a numerical controller or NC 34 that includes a processor. The tool setting device 2 is also connected to the NC 34 via an interface 36. The interface 36 is connected to the tool setting device 2 via electrical cables 17. The interface 36 provides electrical power to the tool setting device. In addition, the interface 36 is connected to an external computer 31 for performing more complex processing tasks (such as image analysis). It should be noted that the computer 31 may also direct operation of the NC 34 (e.g. by sending a series of movement instructions that are acted upon by the NC 34). It should also be noted that the interface 36 does not have to be a discrete unit and may be formed as part of the NC 34 or the external computer 31. In use, the machine tool (under control of the NC 34) can move the tool 32 into, and out of, the light beam as required thereby allowing the tool to be measured.

The tool setting device 2 would typically be located on a region of the machine tool bed 4 where large amounts of coolant and cutting debris can be present during a cutting operation. The device thus includes a protection system comprising a first shutter assembly 40 for protecting the imaging sensor 14 and a second shutter assembly 42 for protecting the light source 10. The first and second shutter assemblies 40 and 42 can each adopt three different configurations, namely open, closed and constricted configurations. If the first and second shutter assemblies both adopt the open configuration they provide a relatively wide aperture for the passage of light. In particular, a relatively wide light beam 12a is generated that passes from the light source 10 to the imaging sensor 14. In the absence of any obstructions, the beam 12a is dimensioned to fully illuminate the active area (i.e. the 1000 by 1000 pixels) of the imaging sensor 14. In this manner, a tool placed in the tool sensing region 13 may be inspected using the back-lit image of the tool that is generated by the imaging sensor 14. If the first and second shutter assemblies are both placed in the closed configuration, they completely seal the light source 10 and the sensor 14 from the machine tool environment. In this closed configuration, the light source 10 and sensor 14 are fully protected against contamination from the large amounts of coolant and cutting debris that are typically present when the machine tool performs a cutting operation. Measurement is, of course, not possible in the closed configuration.

The first and second shutter assemblies 40 and 42 can also adopt a constricted configuration. This may also be termed a partially open, restricted or limited configuration. In such a constricted configuration, the shutter assemblies each define a small aperture (i.e. an aperture smaller than the aperture of the open configuration). The small aperture of the first shutter assembly 40 restricts the amount of light directed towards the sensor 14; i.e. the illustrated "narrow" light beam 12b is produced. The small aperture of the second shutter assembly 42 partially covers the imaging sensor 14. The first and second shutter assemblies 40 and 42 are appropriately aligned so that, in the absence of a tool, the narrow light beam 12b passes through the small aperture of the second shutter assembly 42 and falls on the imaging sensor 14.

In the constricted configuration, it is still possible to sense a tool placed in the tool sensing region 13 but the field of view of the device is reduced. It is possible to capture images of the tool over this smaller field of view or, as described in more detail below, the device could be operated in an emulation mode (e.g. as described in WO2019/053432) in which the total intensity of light reaching the sensor is analysed. Such an emulation mode would allow the detection of a tool entering and/or leaving the light beam 12b in a similar manner to a known laser tool setting device of the type described above.

The light reaching the imaging sensor 14 in the constricted configuration is also affected by any contaminants in the machine tool environment, despite the constricted configuration substantially preventing any contamination of the device. The imaging sensor 14 is thus also configured to act as a contaminant sensor for sensing the cleanliness of the machine tool environment. For example, the amount or pattern of light reaching the sensor could be analysed to determine if coolant mist, swarf etc are still present in the local environment. In this embodiment, the interface 36 analyses the light received by the imaging sensor 14 to determine the level of contamination within the machine tool environment, but it should be noted that a separate processor or the like could be provided instead.

The contamination sensed in the constricted configuration is used to indicate when the first and second shutter assemblies 40 and 42 can safely (i.e. with an acceptably low risk of contamination entering the device) adopt the open configuration. The device may thus be configured to monitor the cleanliness of the machine tool environment and to automatically switch from the constricted configuration (i.e. a first mode) to the open configuration (i.e. a second mode) when sufficiently low levels of contaminants are measured. Alternatively, the measured level of contamination may be assessed when the device is instructed to enter the open configuration. For example, the open configuration may only be adopted (e.g. on receipt of a suitable instruction from the NC 34) if the measured contamination is below a certain threshold level. The level of contamination may also be measured when the device is in the open configuration (noting care must be taken to ignore any reductions in light intensity resulting from a tool passing into or out of the beam) and the device may be switched back into the restricted configuration if unacceptable levels of contamination are sensed.

Providing the constricted configuration (i.e. with a smaller aperture) has the advantage of providing more resistance to contamination than when it is in the (fully) open configuration. In other words, the smaller aperture decreases the amount of contamination that can pass to the sensor or light source. The protection provided against contamination may be further enhanced by also providing a flow of gas (e.g. compressed air) out of the device via the apertures of the shutter assemblies. In this example, such compressed air may be received from a compressed air supply tube 38. The constricted configuration (first mode) can thus have a similar resistance to contamination as laser based non-contact tool setting devices, but with the advantage that a full imaging or second mode (i.e. with the shutter assemblies in the open configuration) can also be adopted as required (e.g. when the machine tool environment is sufficiently clear from coolant mist or cutting debris).

As explained above, the interface 36 controls operation of the tool setting device in this example. In particular, the interface 36 can command the device to enter any one of the closed, open and constricted configurations. These are all stable configurations that can be maintained for as long as required. Although it is envisaged that both shutter assemblies would adopt the same configuration at any single point in time, it would be possible to separately set the configuration of the first and second shutter assemblies 40 and 42. The interface 36 may receive instructions from the controller 34 and/or external computer 31 and set the appropriate configuration accordingly.

Referring to FIGS. 2a, 2b and 2c, the open (fully open), constricted (partially open) and closed configurations of a shutter assembly 70 of the type described with reference to FIG. 1 are illustrated in more detail. The open configuration of FIG. 2a provides a first (large) aperture 72 that is dimensioned so that a light beam may pass though it that has a width slightly greater than the width of the imaging sensor. FIG. 2b shows a second (small) aperture 74 of the constricted configuration. The second aperture 74 is smaller than the first aperture 72; the terms "small" and "large" being used to refer to the relative sizes of such apertures. As shown in FIG. 2c, the closed configuration includes no aperture and in this closed configuration a physical and optical barrier is provided that protects the associated light source or sensor. The closed configuration may provide a fluid tight seal.

It should be noted that although circular cross-section apertures are illustrated, the apertures may have any suitable shape. For example, the aperture shape may be selected to correspond to the shape of the sensor. The use of a single aperture per configuration is shown, but it would also be possible for one configuration to provide a plurality of apertures. For example, the constricted configuration may provide a plurality of small apertures that allow a plurality of sections of the imaging sensor to be illuminated. The above example also assumes the open configuration provides an aperture that allows the whole of the imaging sensor to be illuminated, but again this is not essential. The open configuration may only cause some of the imaging sensor to be illuminated. Furthermore, the shutter assembly may provide the constricted configuration shown in FIG. 2b and at least one additional constricted configuration. The additional configuration may have an aperture smaller and/or larger than the aperture of the constricted configuration and/or have one or more apertures.

Referring to FIG. 3, a shutter member 100 is shown that can form part of a shutter assembly of a protection system. The shutter member 100 includes a large aperture 102, a small aperture 104 and a solid region 106 with no aperture. In use, a sensor (or light source) is placed behind the shutter member. The shutter member 100 can then be rotated about its centre so that light may reach the sensor via the small aperture or large aperture as required.

FIG. 4 shows a protection system shutter assembly mechanism 140 that includes a fixed disc 142 and a rotatable disc 144. The fixed disc 142 can be secured to a housing that contains a sensor (or light source) such that the sensor (or light source) is adjacent (behind in the view of FIG. 4) an access hole 143 formed in the fixed disc 142. The centre of the rotatable disc 144 is attached to the fixed disc 142 via a rotary linkage 145 that allows the rotatable disc 144 to be rotated about its centre. The rotatable disc 144 includes a first (large) aperture 146 and a second (small) aperture 148. An actuation piston 150 is held in a central position by centring springs 152. When the actuation piston 150 is in the central position illustrated in FIG. 4, the rotatable disc 144 blocks the access hole 143 thereby preventing light from reaching the sensor; i.e. the closed configuration is provided. The actuation piston 150 can be energised to moved back and forth, thereby rotating the rotatable disc 144. This rotation can, depending on the direction of rotation, bring the first (large) aperture 146 or the second (small) aperture 148 into alignment with the access hole 143. In this manner, the open and constricted configurations can be provided. In the absence of an applied force, the springs bias the assembly into the closed configuration.

FIG. 5 shows an alternative embodiment of measurement apparatus. The apparatus comprises a tool setting device having a light source 210 and imaging sensor 214 contained within and affixed to a common base 220 by pillars 218. The light source 210 and imaging sensor 214 are each protected by a protection system or protection means in the form of shutters 230 that can adopt either an open or a closed configuration. Closing the shutters provides a fluid tight seal that protects the light source 210 and the imaging sensor 214 from damage and/or from the build-up of contaminants that could degrade measurement performance (i.e. a first mode). If both shutters 230 are open light can pass from the light source to the imaging sensor thereby allowing the measurement of tools located in the region between the light source 210 and imaging sensor 214 (i.e. a second mode).

The embodiment shown in FIG. 5 includes a contamination sensing arrangement that is physically integrated into the pillars 218 of the tool setting device but is separate from the light source 210 and imaging sensor 214 that provides the tool measurement functionality. In particular, the contamination sensing arrangement comprises a laser diode light source 240 and a light detector 242 (e.g. a photodiode) that are sealed against the environment. A light beam 241 is passed from the light source 240 to the detector 242 and the intensity of light sensed by the detector 242 is passed to an interface 236 that includes an analysis module for analysing the received light intensity. As described above, the interface 236 can be connected to the numerical controller 234 of the associated machine tool.

The intensity of light received by the contaminant detector 242 varies with the presence of contaminants within the light beam 241. For example, drips of coolant passing through the light beam 241 would cause transient dips in the intensity of detected light whereas coolant mist present within the machine tool would cause a drop in the overall intensity of detected light. The contamination analysis module within the interface 236 analyses the received light intensity for such characteristics and determines whether or not the machine tool environment is sufficiently clear of contaminants to allow the shutters 230 to be opened (i.e. to permit tool measurements). The interface 236 will only act on an instruction from the numerical controller 234 to open the shutters 230 to measure a tool when the contamination analysis module confirms the environment within the machine tool is sufficiently clear. The interface 236 may signal the numerical controller 234 that measurement is not presently possible (e.g. over an error line) if the measured level of contamination is too high.

It should be noted that, unlike the optical system used to acquire tool measurements (i.e. the light source 210 and imaging sensor 214), there is no requirement to provide shutters or the like to protect the contamination sensing arrangement itself (i.e. the light source 240 and the detector 242) from the contaminants within the machine tool environment. The light source 240 and detector 242 are sealed again the environment to prevent the ingress of contaminants and each includes a transparent window through which the light beam passes. Although dirt may accumulate on the transparent windows thereby reducing the amount of light reaching the detector, this effect can be overcome by periodically cleaning the windows and/or normalising the received intensity signal. This should be contrasted to contamination of the optical tool measurement arrangement where any uneven or varying obscuration of the light beam during tool measurement reduces the measurement accuracy that can be obtained.

FIG. 6 shows a further embodiment in which a tool setting device 300 is physically spaced apart from a contamination sensing system 302.

The tool setting device 300 comprises a light source 310 and sensor 314 contained within and affixed to a common base 320 by pillars 318. As described above, a light beam 322 passes from the light source 310 to the sensor 314 that can be interrupted by a tool that is to be measured. In use, the tool setting device 300 is fixed (e.g. bolted) to the bed 304 or another fixed part of a machine tool. The tool setting device 300 is typically located to one side of the machine tool bed in a region away from where the workpiece will be located, but in a position where a tool can be moved into the light beam by the machine tool. A protection system, comprising shutters 330 that can be open or closed, protects the light source 310 and sensor 314. An interface 336 powers and controls the light source 310, sensor 314 and shutters 330. The interface 336 also passes measurement and/or status information to the numerical controller 334 of an associated machine tool.

The contamination sensing system 302 in this embodiment comprises a light source module 340 and a detector module 342. These modules are configured so that they can be mounted within the machine tool enclosure; e.g. suitable brackets and arms etc may be provided to suitably mount the modules. Prior to use, the modules 340 and 342 are thus securely mounted near the tool setting device 300 (e.g. near the light beam 322 of the tool setting device 300) and arranged so that light 352 passes from the light source module 340 to the detector module 342. Although the light 352 is illustrated as a single beam (e.g. a pencil like beam having an oval, circular, Gaussian profile etc) it would also be possible to provide a two-dimensional light curtain (e.g. in a plane above the tool setting device 300 and inclined or substantially parallel to the machine tool bed). The position of the modules 340 and 342 relative to the tool setting device 300 would preferably be set so that any contaminants (e.g. cutting debris or streams/drops of coolant) would pass through the light beam 352 of the contamination sensing system 302 before reaching the tool setting device 300. In this way, contaminants can be sensed that might enter an open shutter 330 thereby contaminating the optics of the light source 310 or sensor 314.

The contamination sensing system 302 also includes a contamination analysis module 360 that is connected to the light source module 340 and detector module 342 by cables. The contamination analysis module 360 thus powers and controls the light source module 340 and the detector module 342. The contamination analysis module 360 also receives light intensity information from the detector module 342 and analyses such information to ascertain if contaminants are present in the machine tool environment. Information on the level of contamination within the machine tool environment is passed from the contamination analysis module 360 to the interface 336 of the tool setting device 300. This information may simply indicate whether or not the environment is sufficiently clear to open the shutters 330 or it may provide a measure of the level of contamination. The interface 336 can thus use this information to ascertain when it is acceptable to open the shutters 330 to allow a tool measurement.

The above are merely examples of how a "break-beam" tool setting or vision device could include an optical contamination sensing system. There are, however, numerous variants encompassed by the present invention that would be apparent to the skilled person. For example, the apparatus may include an alternative measurement device (e.g. contact probes or contact tool setters, laser based tool setters etc). Some of these will be described below.

Referring to FIG. 7, a further embodiment is illustrated. A single-sided tool detection device 400 is shown. The illustrated tool detection device 400 comprises a camera 402 for capturing images of objects, such as a tool 404, located within its field of view 406. The tool may be illuminated by a light source (not shown) or ambient light. A high-speed shutter assembly 408 includes a shutter that can be opened and closed to uncover or protect the camera 402. Instead of camera 402, a laser based (reflective) tool detection system could be provided.

A contamination sensing system 410 comprising an optical transmitter 412 and an optical receiver 414 is placed a distance "d" away from the tool detection device 400. The contamination sensing system 410 is arranged to detect any contaminants (e.g. debris ejected from the rotating tool 404 or a stream/drip of coolant expelled from the machine tool) that pass through a light curtain 416 provided between the optical transmitter 412 and an optical receiver 414. The shutter is permitted to open in the absence of such contaminants. Furthermore, the shutter is configured to close if any contaminants are detected when the shutter is open. A droplet of fluid 420 is illustrated in FIG. 6 moving towards the tool detection device 400. The droplet 420 would be sensed as it passes through the light curtain 416 and the shutter is closed in response to the droplet 420 being detected. This arrangement requires the shutter response time to be sufficient rapid (taking into account the separation distance d) to allow the shutter 408 to be closed before the droplet 420 reaches it.

It should be noted that using the contamination sensing system 410 to close the shutter is possible in this arrangement because the tool does not need to pass through the light curtain 416 to be measured by the single-sided tool detection device 400. If the tool did need to pass though the light curtain 416 during a measurement, then the contamination sensing system 410 could be arranged to distinguish contaminants from the tool and/or the functionality of closing the shutter could be inhibited when the tool is known to be present in the light curtain 416.

FIG. 8 illustrates apparatus comprising a contact tool setting device 500 in combination with a contamination sensing system 502.

The tool setting device 500 is of known type and comprises a probe 503 having a stylus 504 with a cube 506 at its distal end. Sensors within the probe 503 measure deflection of the stylus 504 thereby allowing the measurement of tools that are brought into contact with the cube 506. The tool setting device 500 includes a protection system in the form of a retractable shroud or cover 510. The cover 510 can be extended (as shown in dashed outline). In the extended configuration, the stylus 504 is protected from swarf and other cutting debris that might wrap around or foul it. The cover 510 can also be retracted (as shown in solid outline) thereby exposing the stylus 504 and cube 506 to allow measurements of an object.

The contamination sensing system 502 comprising an optical transmitter 512 and an optical receiver 514 spaced apart from (e.g. directly above) the contact tool setting device 500. The contamination sensing system 502 is arranged to detect any contaminants (e.g. swarf or debris ejected from a rotating tool and/or a stream/drip of coolant expelled from the machine tool) that pass through a light beam 516 provided between the optical transmitter 512 and an optical receiver 514. The contamination sensing system 502 indicates when the environment is sufficiently clean, whereupon the cover 510 of the tool setting probe 504 can be retracted to allow measurements to take place.

It should again be noted that the above are only examples of the present invention. The protection system described above comprises one or more shutters or covers and optionally an expulsion of air, but it is important to note that any type of protection system could be provided. For example, the protection system may comprise just expelling compressed air through an aperture (the protection system would then protect the measurement device when the air flow is active and there would be less protection when the air flow was reduced or stopped). The various components of the apparatus could also be distributed in a variety of ways and certain functions could be implemented by the controller of the machine tool and/or a standalone computer. It would also be possible for features of the different embodiments to be combined. The examples outlined above describe the measurement apparatus being mounted to a machine tool, but the apparatus could instead be mounted to other types of machine (e.g. welding machines, electrical discharge machines (EDMs), laser cutters, additive manufacturing machines, powder coating machines etc.) Furthermore, the skilled person would also be able to implement variants and modifications to the above without departing from the underlying concept of the present invention.

The invention claimed is:

1. A measurement apparatus for mounting within an enclosure of a machine, comprising;
   a measurement device, and
   a protection means for protecting the measurement device from contaminants present within the enclosure, the protection means being switchable between at least a first mode that protects the measurement device from contaminants and a second mode that provides less protection of the measurement device from contaminants than the first mode, wherein
   the apparatus comprises a contaminant sensor for sensing contamination within the enclosure, the sensed contamination being used to determine when the protection means can adopt the second mode, and
   the measurement device comprises an optical tool-setting device having a transmitter for passing light to a receiver along an optical beam path into which a tool to be measured can be inserted.

2. An apparatus according to claim 1, wherein the apparatus is arranged so that the protection means can only be switched into the second mode when the contamination sensed by the contaminant sensor is below a threshold.

3. An apparatus according to claim 1, wherein the apparatus is arranged such that the protection means is switched into the first mode when the contamination sensed by the contaminant sensor exceeds a threshold.

4. An apparatus according to claim 1, comprising a controller for analysing the output of the contaminant sensor and for controlling the protection means.

5. An apparatus according to claim 1, wherein the measurement device comprises a non-contact measurement device including an optical receiver and/or an optical transmitter, the protection means being arranged to prevent contamination of the optical receiver and/or the optical transmitter.

6. An apparatus according to claim 1, wherein the protection means comprises at least one shutter for protecting the measurement device, the shutter providing a larger aperture in the second mode than in the first mode.

7. An apparatus according to claim 1 in which the measurement device comprises a measurement sensor, wherein a single sensor provides both the measurement sensor and the contaminant sensor.

8. An apparatus according to claim 1, wherein the measurement device includes a measurement sensor that is different to the contaminant sensor.

9. An apparatus according to claim 1, wherein the contaminant sensor is an optical sensor that analyses received light that has passed to the optical sensor through a region within the enclosure.

10. An apparatus according to claim 1, wherein the measurement device, the protection means and the contaminant sensor are provided within a single measurement unit.

11. An apparatus according to claim 1, wherein the measurement device and the contaminant sensor are provided as a plurality of separate units.

12. An apparatus according to claim 1, wherein the measurement device can acquire object measurements when the protection means is in both the first and second modes.

13. An apparatus according to claim 1, wherein the protection means can also adopt at least one additional mode.

14. A method for operating a measurement apparatus mounted within the enclosure of a machine, the measurement apparatus comprising (a) a measurement device that includes an optical tool-setting device having a transmitter for passing light to a receiver along an optical beam path into which a tool to be measured can be inserted and (b) a protection means for protecting the measurement device from contaminants present within the enclosure, the protection means being switchable between at least a first mode that protects the measurement device from contaminants and a second mode that provides less protection of the measurement device from contaminants than the first mode,
   wherein the method comprises the steps of:
   (i) sensing an amount of contamination within the enclosure, and
   (ii) determining when the protection means can adopt the second mode based on the amount of contamination sensed in step (i).

15. A measurement apparatus for mounting within an enclosure of a machine, comprising;
   a measurement device, and
   a shutter for protecting the measurement device from ingress of contaminants present within the enclosure, the shutter being switchable between at least a first mode that protects the measurement device from contaminants and a second mode that provides less protection of the measurement device from the ingress of contaminants than the first mode, the shutter providing a larger aperture in the second mode than in the first mode, wherein
   the apparatus comprises a contaminant sensor for sensing contamination within the enclosure, the sensed contamination being used to determine when the shutter can adopt the second mode.

16. A measurement apparatus for mounting within an enclosure of a machine, comprising;

a measurement device, and a protection means for protecting the measurement device from contaminants present within the enclosure, the protection means being switchable between at least a first mode that protects the measurement device from contaminants and a second mode that provides less protection of the measurement device from contaminants than the first mode, wherein the apparatus comprises a contaminant sensor for sensing contamination within the enclosure, the sensed contamination being used to determine when the protection means can adopt the second mode, and the measurement device comprises a measurement sensor, wherein a single sensor provides both the measurement sensor and the contaminant sensor.

\* \* \* \* \*